United States Patent [19]

Whittenberger et al.

[11] Patent Number: 5,737,839
[45] Date of Patent: Apr. 14, 1998

[54] ASSEMBLY AND METHOD FOR MAKING CATALYTIC CONVERTER STRUCTURES

[75] Inventors: William A. Whittenberger, Leavittsburg; John J. Chelbus, Brookfield, both of Ohio; Joseph E. Kubsh, Silver Spring, Md.; Boris Y. Brodsky, Mayfield Heights, Ohio

[73] Assignee: Engelhard Corporation, Iselin, N.J.

[21] Appl. No.: 720,412

[22] Filed: Sep. 30, 1996

Related U.S. Application Data

[62] Division of Ser. No. 577,616, Dec. 22, 1995.

[51] Int. Cl.$^6$ ............................ B01J 35/04; B21D 11/06
[52] U.S. Cl. ...................... 29/890; 422/177; 422/180; 422/211; 422/222; 502/439; 502/527; 428/116; 428/593
[58] Field of Search ............................ 422/177, 180, 422/211, 222; 428/116, 593, 594; 60/299; 502/439, 527; 29/890

[56] References Cited

U.S. PATENT DOCUMENTS

| | | | |
|---|---|---|---|
| 3,966,646 | 6/1976 | Noakes et al. | 502/439 |
| 4,782,570 | 11/1988 | Spridco | 29/890 |
| 5,546,746 | 8/1996 | Whittenberger et al. | 422/180 |

Primary Examiner—Hien Tran

[57] ABSTRACT

A catalytic converter body having a jacket tube, a plurality of non-nestable foil leaves having inner and outer ends defining a leaf length, the outer ends being connected to the jacket tube and radiating inward to provide flow passages generally transverse to the leaf length, and a pliant central core joined to the inner ends of the radiating foil leaves. The catalytic converter body has a natural frequency of between 10 and 100 hertz. The catalytic converter is formed by assembling a plurality of non-nestable foil leaves by interconnecting proximal ends of the foil leaves to provide a continuous flexible strip of overlapping foil leaves in which opposite the distal ends of the leaves extend freely. The strip of foil leaves is then formed into a pliant central core permitting movement of the inner ends relative to each other, and the leaves are arranged to lie in curved paths radiating outwardly from the interconnected proximal ends away from a central area to provide flow passage cells generally parallel to the leaf ends. Thereafter, the distal ends of the leaves are connected to a jacket tube.

10 Claims, 7 Drawing Sheets

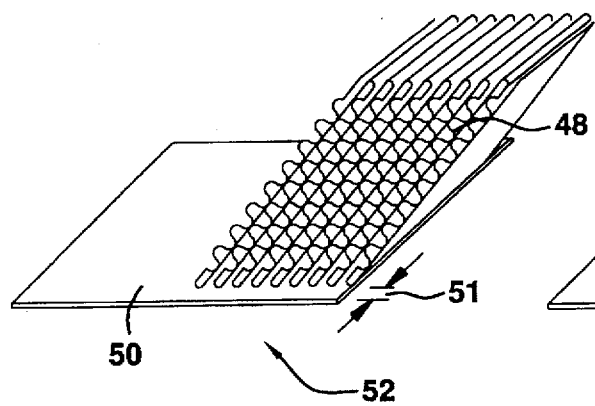
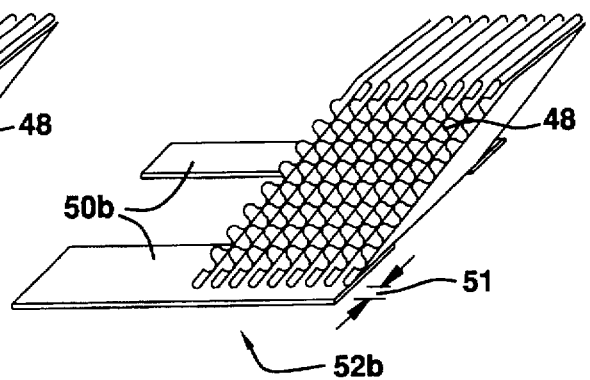
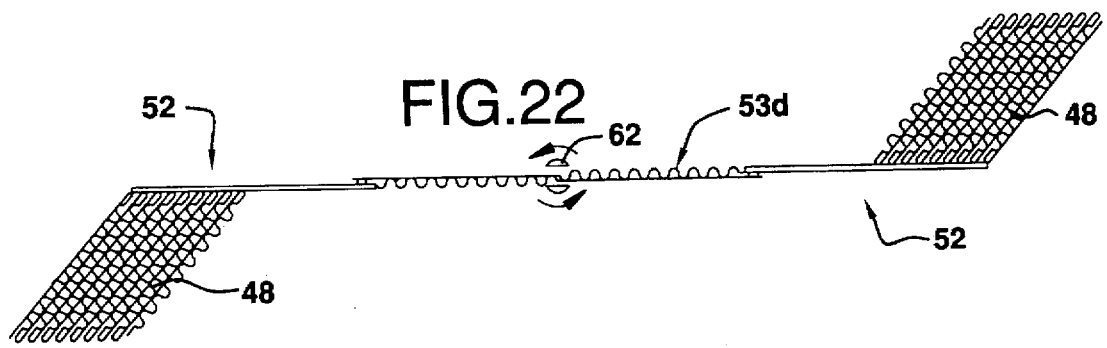
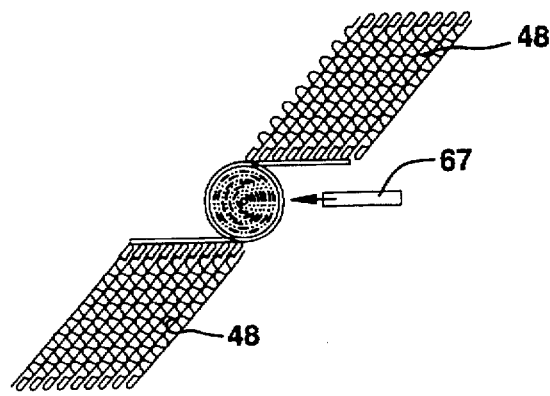

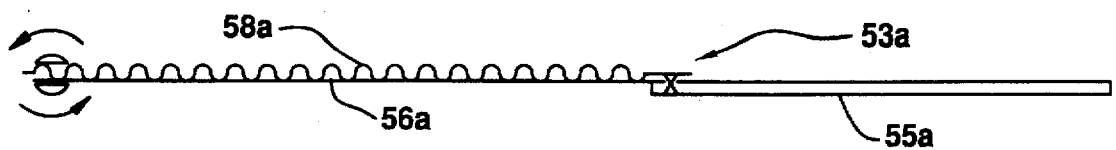
FIG. 15
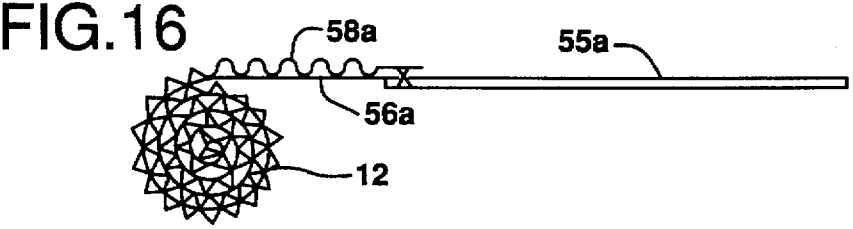
FIG. 16
FIG. 17
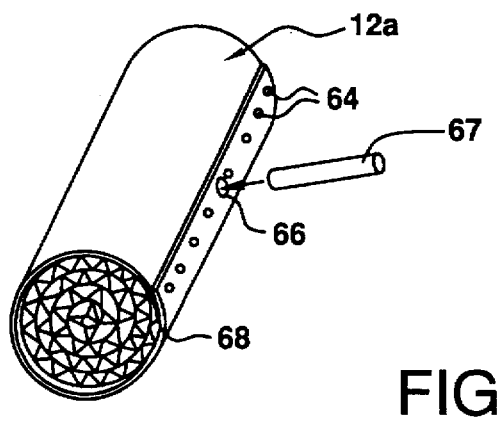
FIG. 18
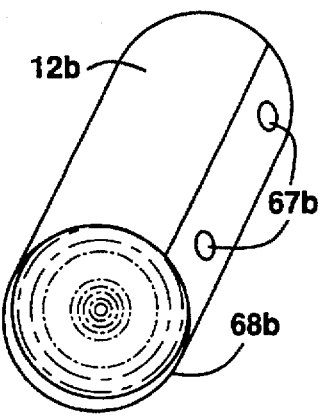
FIG. 19
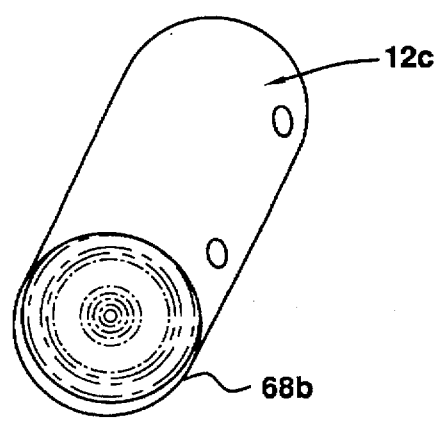

ASSEMBLY AND METHOD FOR MAKING CATALYTIC CONVERTER STRUCTURES

This is a division of application Ser. No. 08/577,616, filed Dec. 22, 1995.

CROSS REFERENCE TO RELATED APPLICATION

The present application is related to U.S. application Ser. No. 08/501,755, filed Jul. 12, 1995 by David T. Sheller and William A. Whittenberger, and to concurrently filed U.S. applications, entitled Assembly and Method for Making Catalytic Converter Structures, as follows: Ser. No. 08/580, 101 by David T. Sheller and William A. Whittenberger; Ser. No. 08/577,618 by William A. Whittenberger and Boris Y. Brodsky; Ser. No. 08/580,102 by David T. Sheller, Steven Edson and William A. Whittenberger; Ser. No. 08/577,615 by William A. Whittenberger, David T. Sheller, and Gordon W. Brunson; Ser. No. 08/577,619 by David T. Sheller, William A. Whittenberger and Joseph E. Kubsh; Ser. No. 08/577,617 by William A. Whittenberger, Gordon W. Brunson, and Boris Y. Brodsky; and Ser. No. 08/580,103 by William A. Whittenberger and Gordon W. Brunson; The complete disclosure of all of these applications are incorporated herein by reference.

BACKGROUND OF THE INVENTION

1. Field of the Invention

The present invention relates to metallic catalytic converters, and, more particularly, to such converters especially adapted for use in vehicular engines to control exhaust emissions, and to methods for the manufacture of such converters.

2. Description of the Related Art

Catalytic converters containing a corrugated thin metal (stainless steel) monolith typically have been formed of a plurality of thin metal sheets or foil leaves wound about a central pin or about spaced "fixation" points. Such prior catalytic converter bodies, have supported both the outer and inner end of the individual layers by fixing them to the housing for the converter body and a central pin or post. In certain instances, the interior support has been provided by looping the foil leaves about a fixed point or portions whereby the inner ends of the leaves have been supported by other foil leaves. The thin metal strips or leaves forming the multicellular honeycomb body also have been brazed together at points intermediate the ends to form a rigid honeycomb monolith. Various techniques such as soldering, welding, brazing, riveting, clamping, reverse wrapping or folding, or the like, have been used to secure the inner and outer ends, and usually the intermediate portion, of the leaves or strips to the support member. While many techniques have been used to assemble the leaves into the housing and many leaf arrangements have been constructed, many arrangements have been unable to survive severe automotive industry tests known as the Hot Shake Test, the Hot Cycling Test, combinations of these tests, cold vibration testing, water quench testing, and impact testing.

The Hot Shake test involves oscillating (50 to 200 Hertz and 28 to 80 G inertial loading) the device in a vertical, radial or angular attitude at a high temperature (between 800 and 1050 degrees C.; 1472 to 1922 degrees F., respectively) with exhaust gas from a gas burner or a running internal combustion engine simultaneously passing through the device. If the device telescopes, or displays separation or folding over of the leading or upstream edges of the foil leaves, or shows other mechanical deformation or breakage up to a predetermined time, e.g., 5 to 200 hours, the device is said to fail the test.

The Hot Cycling Test is run with exhaust flowing at 800 to 1050 degrees C.; (1472 to 1922 degrees F.) and cycled to 120 to 200 degrees C. once every 13 to 20 minutes for up to 300 hours. Telescoping or separation of the leading edges of the thin metal foil strips, or mechanical deformation, cracking or breakage is considered a failure.

Also, the Hot Shake Test and the Hot Cycling Test are sometimes combined, that is, the two tests are conducted simultaneously or superimposed one on the other.

The Hot Shake Test and the Hot Cycling Test are hereinafter called "Hot Tests". While they have proved very difficult to survive, the structures of the present invention are designed to survive these Hot Tests and other tests similar in nature and effect that are known in the industry.

From the foregoing, it will be appreciated that catalytic converter bodies and their method of manufacture have received considerable attention, particularly by the automotive industry, are complex in design and manufacture, and are in need of improvement.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the catalytic converter body of the present invention comprises a jacket tube, a plurality of non-nestable foil leaves having inner and outer ends defining a leaf length, the outer ends connected to the jacket tube and radiating inward to provide flow passages generally transverse to the leaf length, and a pliant central core joined to the inner ends of the radiating foil leaves. As such, the catalytic converter body of the invention has a natural frequency of between 10 and 100 hertz.

In another aspect, the advantages and purpose of the invention will be realized and attained by a catalytic converter body comprising a central core having an outer periphery defined by inner and outer foil layers, a jacket tube spaced from the central core, and a radiating leaf section including plurality of foil leaves. The foil leaves are shaped to define fluid passage cells, have inner and outer ends, and extend in adjacent curved paths from the outer periphery of the central core to the jacket tube. The inner ends of the foil leaves are connected to the outer layer of the central core, and the outer ends of the foil leaves are connected to the jacket tube.

In still another aspect, the advantages and purpose of the invention will be realized and attained by a method of forming a catalytic converter in which a plurality of non-nestable foil leaves, each having opposite proximal and distal ends defining a leaf length, are assembled by interconnecting the proximal ends of the foil leaves to provide a continuous flexible strip of overlapping foil leaves in which the distal ends of the leaves extend freely. Subsequently, the strip of foil leaves is formed into a pliant central core permitting movement of the inner ends relative to each other, and the leaves are arranged to lie in curved paths radiating outwardly from the interconnected proximal ends away from a central area to provide flow passages generally transverse to the leaf length. Thereafter, the distal ends of the leaves are connected to a jacket tube.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

FIG. 7 is an isometric view showing a tail piece subassembly of the present invention;

FIG. 8 is an isometric view showing a variation of the tail piece subassembly;

FIG. 15 is a side elevation illustrating the initial stage of forming a central core unit of the invention;

FIG. 16 depicts a step of winding of the central core unit in accordance with a method of the present invention;

FIG. 17 is an isometric view showing the final stage of forming the central core unit;

FIGS. 18 and 19 are isometric views showing variations of the central core unit shown in FIG. 17;

FIGS. 22 and 23 are side elevations depicting successive stages of an alternative method for the making the core body of the invention.

DESCRIPTION OF THE PREFERRED EMBODIMENTS

Figure 1:
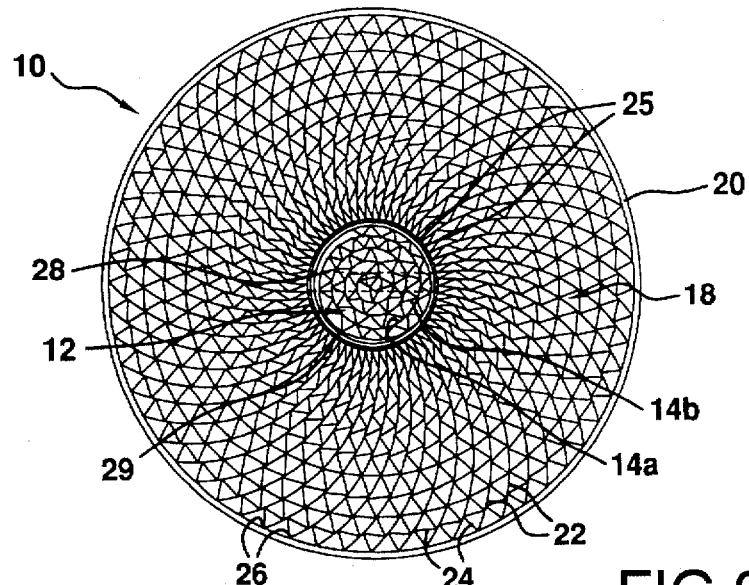
FIG. 1 is an end view of a catalytic converter body of the present invention.

Reference will now be made in detail to the present preferred embodiments of the invention, which are illustrated in the accompanying drawings. Wherever possible, the same reference numbers will be used throughout the drawings to refer to the same or like parts.

One aspect of the present invention is based on a finding by the inventors that the structure of a metallic catalytic converter body can be improved by allowing the metal sheets referred to as foil leaf core elements or foil leaves to be compliant, move, flex, or float in the fluid stream. Whereas it was previously thought that rigidity was essential to prevent failure in the "Hot Tests", it has been discovered that flexure or compliance of the foil leaf core elements in response to thermal and fluid flow variations as well as mechanical vibration were desirable attributes in converter bodies used in various applications.

The foil leaf arrangement may be constructed from "ferritic" stainless steel such as that described in U.S. Pat. No. 4,414,023 Aggen. One usable ferritic stainless steel alloy contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel is commercially available from Allegheny Ludlum Steel Co. under the trademark "Alfa IV".

Another usable commercially available stainless steel metal alloy is identified as Haynes 214 alloy. This alloy and other useful nickeliferous alloys are described in U.S. Pat. No. 4,671,931 dated 9 Jun. 1987 to Herchenroeder et al. These alloys are characterized by high resistance to oxidation and high temperatures. A specific example contains 75% nickel, 16% chromium, 4.5% aluminum, 3% iron, optionally trace amounts of one or more rare earth metals except yttrium, 0.05% carbon, and steel making impurities. Haynes 230 alloy, also useful herein has a composition containing 22% chromium, 14% tungsten, 2% molybdenum, 0.10% carbon, a trace amount of lanthanum, balance nickel.

The ferritic stainless steels, and the Haynes alloys 214 and 230, all of which are considered to be stainless steels, are examples of high temperature resistive, oxidation resistant (or corrosion resistant) metal alloys that are useful for use in making the foil leaf core elements or leaves of the present invention, as well as the multicellular honeycomb converter bodies thereof. Suitable metal alloys must be able to withstand "high" temperature, e.g., from 900 degrees C. to 1200 degrees C. (1652 degrees F. to 2012 degrees F.) over prolonged periods.

Other high temperature resistive, oxidation resistant metal alloys are known and may be used herein. For most applications, and particularly automotive applications, these alloys are used as "thin" metal or foil, that is, having a thickness of from about 0.001" to about 0.005", and preferably from 0.0015" to about 0.0037". The housings, or jacket tubes, hereof are of stainless steel and have a thickness of from about 0.03" to about 0.008", preferably, 0.04" to 0.06".

The multicellular converter bodies of the present invention preferably are formed from foil leaves precoated before assembly, such as described in U.S. Pat. No. 4,711,009 to Cornelison et al. The converter bodies of the invention may be made solely of corrugated foil core elements which are non-nesting, or of alternating corrugated and flat foil core elements, or of other arrangements providing cells, flow passages, or a honeycomb structure when assembled. In the preferred embodiments, the foil leaves, which will be used as core elements, are precoated before assembly. The ends are masked or cleansed to maintain them free of any coating so as to facilitate brazing or welding to the housing or to an intermediate sleeve.

As indicated in U.S. Pat. No. 4,911,007, supra, the coating is desirably a refractory metal oxide, e.g., alumina, alumina/ ceria, titania, titania/alumina, silica, zirconia, etc., and if desired, a catalyst may be supported on the refractory metal oxide coating. For use in catalytic converters, the catalyst is normally a noble metal, e.g., platinum, palladium, rhodium, ruthenium, indium, or a mixture of two or more of such metals, e.g., platinum/rhodium. The refractory metal oxide coating is generally applied in an amount ranging from about 10 mgs/square inch to about 80 mgs/ square inch.

In some applications, corrugations preferably have an amplitude of from about 0.01 inch to about 0.15 inch, and a pitch of from about 0.02 inch to about 0.25 inch. The amplitude and pitch of the corrugations determine cell density, that is, the number of cells per unit of cross-sectional area in the converter body. Typically, the cell density is expressed in cells per square inch (cpsi) and may vary from about 50 cpsi to 2000 cpsi.

Where a non-nesting corrugated foil leaf core element is used, the corrugations are generally patterned, e.g., a herringbone pattern or a chevron pattern, or skewed pattern. In a "skewed pattern", the corrugations are straight, but at an angle of from 3 degrees to about 10 degrees to the parallel marginal edges of the strips. The latter foil leaf core elements may be layered without nesting.

Where alternating corrugated and flat foil leaf core elements are used in a non-nesting arrangement to form the multicellular bodies, straight-through corrugations may be conveniently used, these exhibiting the lowest pressure drop at high flow in fluid flowing through the converter body. The straight-through corrugations are usually oriented along a line normal to the longitudinal marginal edges of the foil leaves, although, as indicated above, the corrugations may be oriented along a line oblique to the longitudinal marginal edges of the leaves.

To reduce stress, the "flat" foil leaf core elements preferably are lightly corrugated to have corrugations with an amplitude of from about 0.002" to about 0.01", e.g., 0.005"and a pitch of from about 0.02" to about 0.2", e.g., 0.1".

The coated corrugated and flat foil leaves that form the working gas flow passageways in the converter body of the invention constitute the major metal foil content thereof and are preferably formed of the lower cost ferritic stainless steel alloys. Because of its greater strength, albeit higher cost, the nickeliferous stainless steel alloys may be used in the converter of the invention particularly in the center area and other areas where the requirement for foil strength justifies the higher cost of these alloys. In the ensuing description and in the appended claims, the latter foil alloys may be referred to generically as "high strength" foil and may be uncoated to facilitate joining by spot welding, for example.

In accordance with the present invention, a catalytic converter body is structured to provide a jacket tube, a plurality of non-nestable foil leaves joined to the jacket tube and radiating inward to provide flow passages generally transverse to the radiating direction, and a pliant central core joined to the inner ends of the radiating foil leaves. As such, the body has a natural frequency of between 10 and 100 hertz. The pliant central core may be a coil of non-nestable foil providing flow passages in the same direction as those of the radiating foil leaves and is formed at its outer periphery with inner and outer foil layers. The inner ends of the foil leaves are connected to the outer foil layer of the central core and that layer may flex relative to the inner foil layer to provide compliancy in the converter body. Although the following preferred embodiments provide a resulting body or assembly that can be inserted into a cylindrical jacket, bodies of other shapes may also be constructed according to the teachings of the present invention.

In FIG. 1 of the drawings, an embodiment of the catalytic converter body of the present invention is designated generally by the reference numeral 10 and shown to include a central core 12 formed of non-nesting foil, preferrably as a coil of alternating flat and corrugated foil convolutions 14a and 14b, respectively. A leaf section 18 in the illustrated embodiment is formed as an annulus between the outer periphery of the core 12 and a jacket tube 20. The annular leaf section 18 is also preferably formed of alternating corrugated and flat leaves 24 and 22, respectively which radiate outwardly from inner ends 25 at the periphery of the core 12 to outer ends 26 at the inner surface of the jacket tube 20 in adjacent curved, preferably involute, paths. The periphery of the central core 12 is defined by inner and outer layers 28 and 29, respectively, and will be described in more detail below.

Figure 2B:
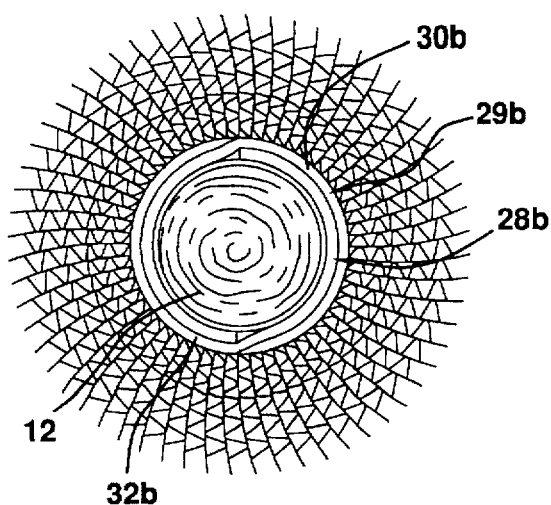
FIG. 2B is an enlarged fragmentary end view showing a variation in the center structure of the converter body illustrated in FIG. 1.
Figure 2A:
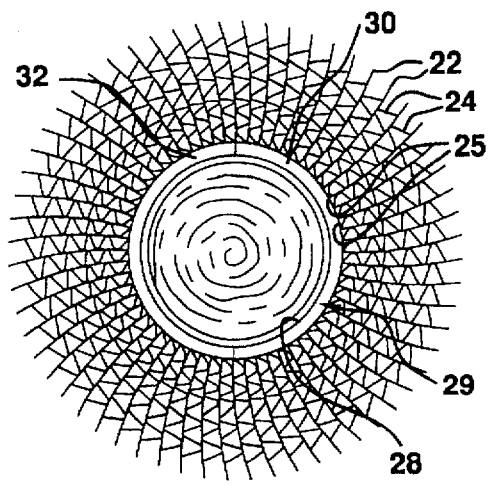
FIG. 2A is an enlarged fragmentary end view showing the center structure of the converter body illustrated in FIG. 1.

Because the scale of FIG. 1 does not permit a detailed illustration of the outer periphery of the core 12, in FIGS. 2A and 2B, the thickness of the respective inner and outer foil layers at the periphery of the core 12 is exagerated to show these layers more clearly. Although the inner layer 28 is illustrated in FIG. 2A as a cylindrical tube, as will be seen from the description of the various alternative embodiments of the invention to follow, it may be formed by an outer wrap portion of a coiled central core or by an overlapped and welded layer of foil, preferably uncoated high strength foil, to which an outer foil wrap portion 29 may be joined by spot welding, for example.

In the embodiment illustrated in FIG. 2A, the outer layer 29 of the central core 12 includes a pair of foil wrap portions 30 and 32, each of which extends through one half of the circumference at the outer periphery of the core 12. The wrap portions 30 and 32 of the outer layer 29 are secured, such as by spot welding, to the outer surface of the inner layer 28 of the central core 12. Also, the wrap portions 30 and 32 of the outer layer 29, are connected to the inner ends 25 of the foil leaves 22 and 24 in a manner to be described in more detail below.

In FIG. 2B, a variation of the peripheral portion of the central core 12 is shown. In this variation, the inner and outer layers 28b and 29b are formed by overlapping wrapped foil strips or "tail pieces" 30b and 32b, each being of a length approximating the full circumference of the core 12. Thus, the inner layer 28b is formed by underlying wrap portions of the foil tail pieces 30b and 32b, whereas the outer layer 29b is formed by overlying portions of the same wrapped tail pieces.

Figure 3:
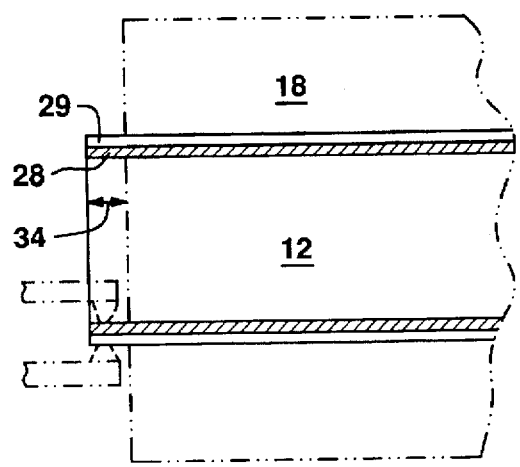
FIG. 3 is a partially schematic cross-section on line 3—3 of FIG. 2A.

The overlapped portions of the foil tail pieces 30b and 32b are secured to the inner layer 28, preferrably by spot welding. To this end, and as shown in FIG. 3, the inner and outer layers 28 and 29 of the central core 12 may be formed to extend from opposite ends of the leaf section 18 and the central core 12 as end margins 34. In the end margins 34, the inner and outer layers 28 and 29 may be spot welded circumferentially to join the layers at the periphery of the central core 12 using, for example, welding electrodes shown in phantom lines.

For some applications where increased rigidity is desired in the central core, the end margins 34 of the inner and outer foil wrap portions as layer 28 and 29 may be spot welded or joined more extensively throughout the full circular cross-section thereof. In other applications, where more flexibility is desired in the connection of the leaf section 18 with the central core 12, the outer portions of the outer layer 29 may be unconnected to the underlying portions of the inner layer 28.

A more complete understanding of the structure of the catalytic converter body of the present invention may be had by understanding the methods by which it may be made. A preferred method for assembling the catalytic converter body 10 involves assembling a plurality of non-nestable foil leaves, each having opposite proximal and distal ends defining a leaf length, by interconnecting the proximal ends of the foil leaves to provide a continuous flexible strip of overlapping foil leaves in which the distal ends of the leaves extend freely; subsequently forming the strip of foil leaves into or about a pliant central core permitting movement of at least some of the proximal inner ends relative to others of the inner ends, arranging the leaves to lie in curved paths radiating outwardly from the interconnected proximal ends away from the central core to provide flow passages generally transverse to the leaf length; and subsequently connecting the distal ends to a jacket tube. The core may be formed separately, in which case the assembled foil leaves are connected to and wrapped about the core, or the core may be formed as a core foil subassembly and attached to the assembled foil leaves. In the latter case, the core foil subassembly and the assembled leafs are wound progressively into the central core and the annular leaf section.

Figure 4:
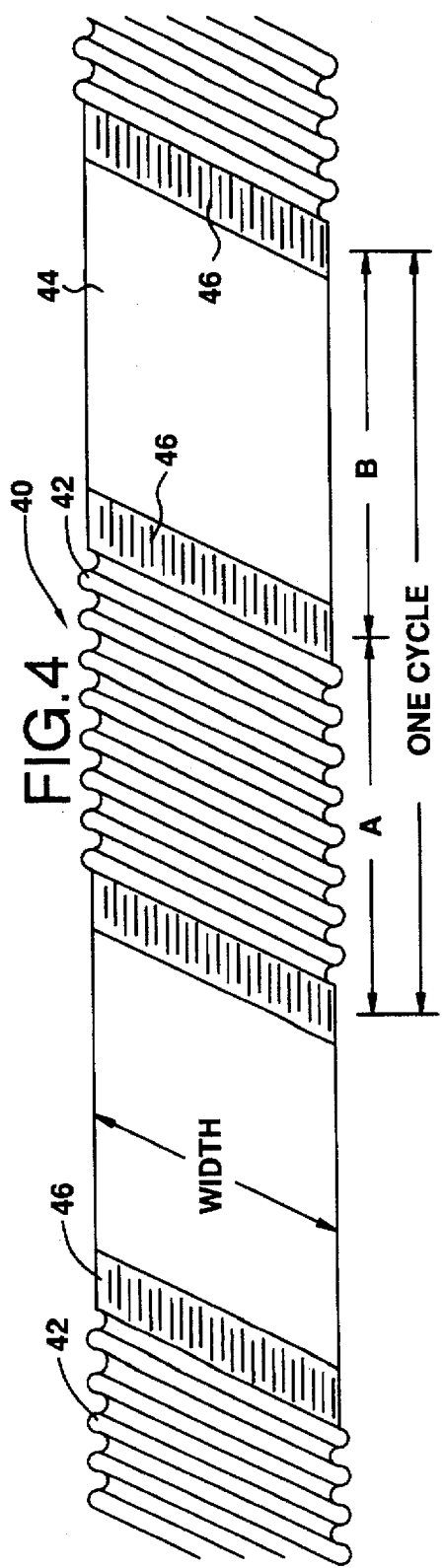
FIG. 4 is an isometric view illustrating a continuous foil strip used to form the converter body of the present invention.
Figure 5:
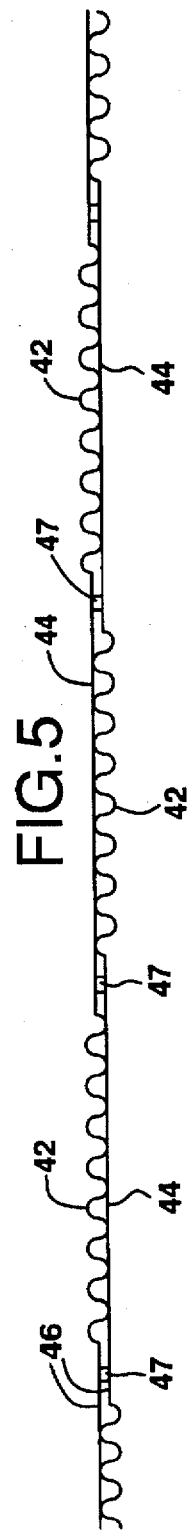
FIG. 5 is a side elevation showing lengths of two superimposed foil strips cut from the continuous foil strip of FIG. 4.

As illustrated in more detail in FIGS. 4–14 of the drawings, the presently preferred method of the invention makes use of a continuous strip of foil designated generally by the reference number 40 in FIGS. 4 and 5 to provide non-nestable coated foil structures in both the central core 12 and the radiating leaf section 18. As shown in FIGS. 4 and 5, the foil strip 40 is formed with longitudinally corrugated and coated segments 42 spaced by coated flat segments 44 of substantially the same length as the corrugated segments of 42. Between each corrugated and flat segment is a transverse band or short segment 46 of uncoated foil. These bands of uncoated foil may be effected by masking during the coating procedure or by removing coating material after the strip 40 is formed. The foil strip 40 may range in width from 2 to 8 inches. Although the strip may extend to any length in practice, the segments 42 and 44 are preferably of an equal length in the range of from 3 inches to 8 inches. Additionally, the combined length of one flat segment 44 and one corrugated segment 42 represents one cycle of foil length, as depicted in FIG. 4.

Figure 6:
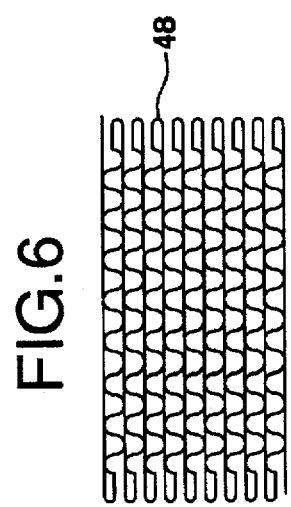
FIG. 6 is a folded stack of the foil illustrated in FIG. 4.

The segment 44 may be cut at the uncoated transverse bands 46 into lengths as short as ½ cycle, if necessary, but more likely into lengths representing multiples of a ½ cycle. The cut lengths may then be superimposed as cut lengths and can be joined if desired, by welds 47 at one or all of the transverse bands 46 in the cut length as shown in FIG. 5. Also, the cut lengths of the foil strip may be folded at the uncoated bands 46 to provide a stacked or folded assembly 48 of alternating corrugated and flat foil segments as shown in FIG. 6. It will be understood that because the folds are at the bands 46 of uncoated foil, opposite ends of the leaves in the folded assembly will be uncoated.

The folded leaf assembly 48 shown in FIG. 6 is then joined with a tail piece 50, preferably by spot welding the foil leaf ends presented as folds on one side of the folded assembly 48, to a tail piece 50, as shown in FIG. 7. The tail piece 50 is preferably a length of uncoated high-strength stainless steel foil to facilitate the welding of the leaves thereto as well as to enable incorporation in the layered periphery of the core 12. Also, in the illustrated embodiment, the tail piece 50 is of a length approximating twice the stacked dimension of the folded assembly 48, or the height of that assembly 48 as shown in FIG. 6. Thus, one half of the tail piece length is occupied by the folded leaf assembly 48 whereas the other half of the tail piece is free of leaves.

It will be apparent from the preceding description, that the arrangement of the tail piece 50 and leaves 48 shown in FIG. 7 is applicable to forming the converter body embodiment of FIG. 2B, where the layers 28 and 29 are formed by overlapping wraps of two such tail pieces. To form the core body construction of FIG. 2A, the folded leaf assembly 48 would occupy the full length of shorter tail pieces. Alternatively, the folded ends on one side of the leaves 48 may be directly interconnected to each other without a tail piece to form a strip of interconnected leaves capable of being wrapped as the outer layer 29 and connected to the inner layer 28 of the central core 12.

In addition, the width of the tail piece 50, in the embodiment shown in FIG. 7, extends from opposite sides of the joined folded leaf assembly 48 preferably by approximately ⅛ inch to provide edge margins 51 on opposite sides of the folded leaf assembly 48. The tail piece subassembly, thus formed, is designated generally by the reference numeral 52 in FIG. 7.

In FIG. 8, a variant of the tail piece subassembly is designated by the reference character 52b and differs from the subassembly 52 in that the folded leaf assembly 48 is joined to a pair of spaced tail pieces 50b with the central regions of the leaf ends unconnected.

It is noted further in connection with the embodiment of FIG. 8, that in a converter body having the generally radial geometry shown in FIG. 1, opposite corners at the inner leaf ends represent critical points of connection to the central core 12. A result of the spaced tail pieces 50b is that those corners will be secured whereas a measure of torsional flexibility is provided between opposite corners at the inner leaf ends.

To form the central core 12 of the converter body 10, from ½ cycle to 10 cycles of the foil strip 40 are cut and overlapped so that the overlapped length of the foil 40 provide layers in which the corrugated segments of one cut strip length overlap the flat segments 44 of the other layer as shown in FIG. 5. Details of the central core construction may vary considerably depending on design parameters for the catalytic converter body 10. An understanding of the various central core structure may be had by reference to FIGS. 9–19 of the drawings.

Figure 9:
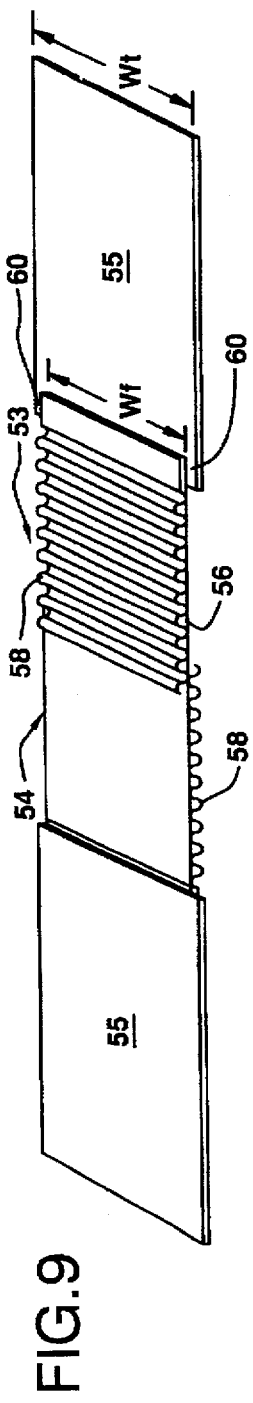
FIG. 9 is an isometric view showing an embodiment of a central foil subassembly of the invention.
Figure 10:
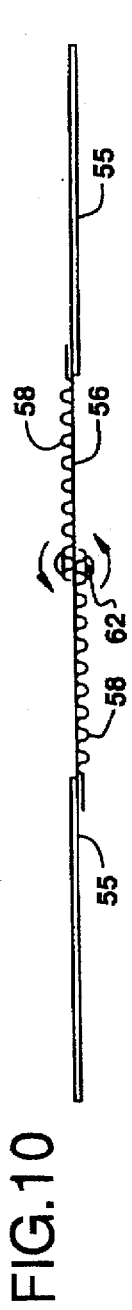
FIG. 10 is a side elevation of the central foil subassembly shown in FIG. 9.
Figure 11:
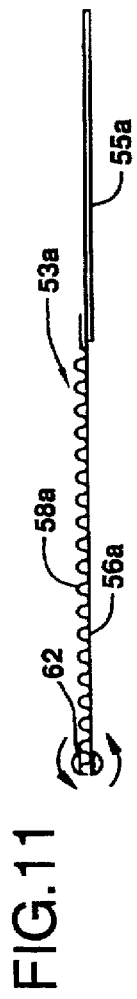
FIGS. 11-14 are side elevations showing alternative embodiments of the central foil subassembly.

In FIGS. 9 and 10, a core foil subassembly is generally designated by the reference numeral 53 and includes a central section 54 connected at opposite ends to a pair of tail pieces 55. As shown in FIGS. 9 and 10, a length of flat foil or a flat foil segment 56, having a width Wf equal to the axial dimension of the fluid passage cells in the central core 12, extends between the tail pieces 55 and is connected at opposite ends to the tail pieces preferably by spot welding. To facilitate the end connections, the foil segment 56 may be cut from a continuous strip like the strip 40 in FIG. 4, as a half cycle, so that the ends are uncoated for such attachment to the tail pieces 55. A pair of coated corrugated foil leaf segments 58 are then placed on opposite sides of the flat foil segment 56 and extend from opposite ends of the flat segment for slightly more than one half of the length of the flat foil segment 56, as shown. The opposite ends of the corrugated foil segments 58 are flat, devoid of coating material and welded to the tail pieces 55.

The tail pieces 55 are preferably formed of uncoated stainless steel, preferably high strength foil, and have a width Wt exceeding the width Wf of the foil layers 56 and 58 by an amount on opposite sides to establish projecting side margins 60. As depicted in FIG. 10, a split mandrel or slotted mandrel 62 is placed over the center of the foil section 52 and wound in the direction of the arrows to form the foil subassembly 53 into a double spiral coil, in this instance, with the tail pieces 55 overlapping on the outer surface of such a coil.

Figure 12:
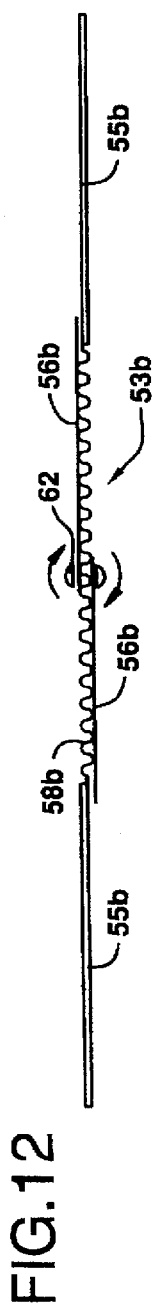
Figure 13:
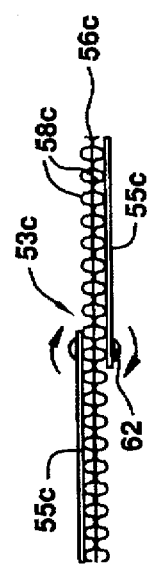

Alternative embodiments of the central foil subassembly shown in FIGS. 9 and 10, are shown in FIGS. 11, 12, 13 and 14 as subassemblies 53a, 53b, 53c, and 53d, respectively. Thus, in FIG. 11, the core foil subassembly 53a is formed by flat and corrugated foil segments 56a and 58a connected at one end only to a tail piece 55a. In FIG. 12, the core foil subassembly 53b is similar to that of FIGS. 9 and 10 except that the corrugated foil segment 58b extends fully between the tail pieces 55b, whereas the flat foil segments 56b overlie opposite sides of the corrugated foil strip 58b. In FIG. 13, the tail pieces 55c are superimposed on corrugated foil segments 58c which overlie opposite sides of a central flat foil segment 56c extending for the same length as the corrugated foil segments 58c. This embodiment is intended where the coiled foil subassembly is secured within a continuous tube as will be explained in more detail below. Finally, in FIG. 14, a core foil subassembly 53d is illustrated in which continuous foil strips having alternating corrugated and flat segments are superimposed in longitudinal offset relationship and secured at opposite ends to a pair of tail pieces 55d.

In FIGS. 15 and 16, the core foil subassembly 53a is shown first in its initial flat configuration in FIG. 15, in a partially coiled configuration in FIG. 16, and in a completely coiled configuration to form a central core unit 12a in FIG. 17. In FIG. 17, the tail piece 55a is shown wrapped in an overlapped sheath configuration on the exterior of the coiled foil subassembly and secured by spot welds 64. At least one diametric bore 66 may be formed through the core unit 12a and a pin 67 inserted in the bore. It will be noted that the ends of the sheath member 68 extend axially beyond the ends of the coiled foil of the unit 12a because the width of the tail piece forming the sheath 68 is greater than the width of the foil segments forming the central portion of the core 12 as explained above.

In FIGS. 18 and 19, alternative embodiments of central core unit are illustrated. In FIG. 18, the core unit 12b is shown with a pair of pins 67b, it being understood that three or more pins may be used depending on the design parameters of the catalytic converter. In FIG. 19, the sheath 68b circumscribing the core unit 12c is a continuous closed tube separate from the coiled unit of the unit 12c. In particular, the core foil subassembly 53c, as shown in FIG. 13 may be used with this type of sheath because of the facility for the wrapped tail pieces 55c to be welded to the interior of the tube-form sheath 68b.

Figure 20:
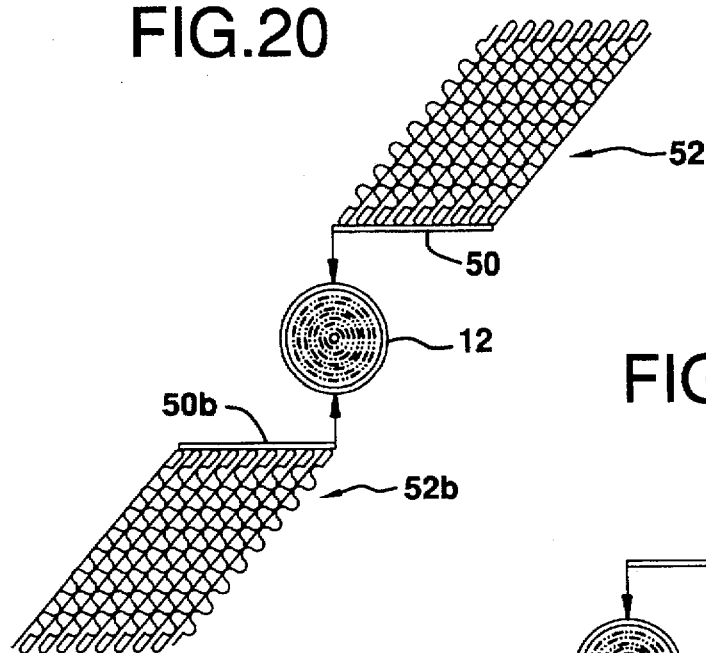
FIGS. 20 and 21 are side elevations depicting the assembly of different tail piece subassemblies with a core unit.
Figure 21:
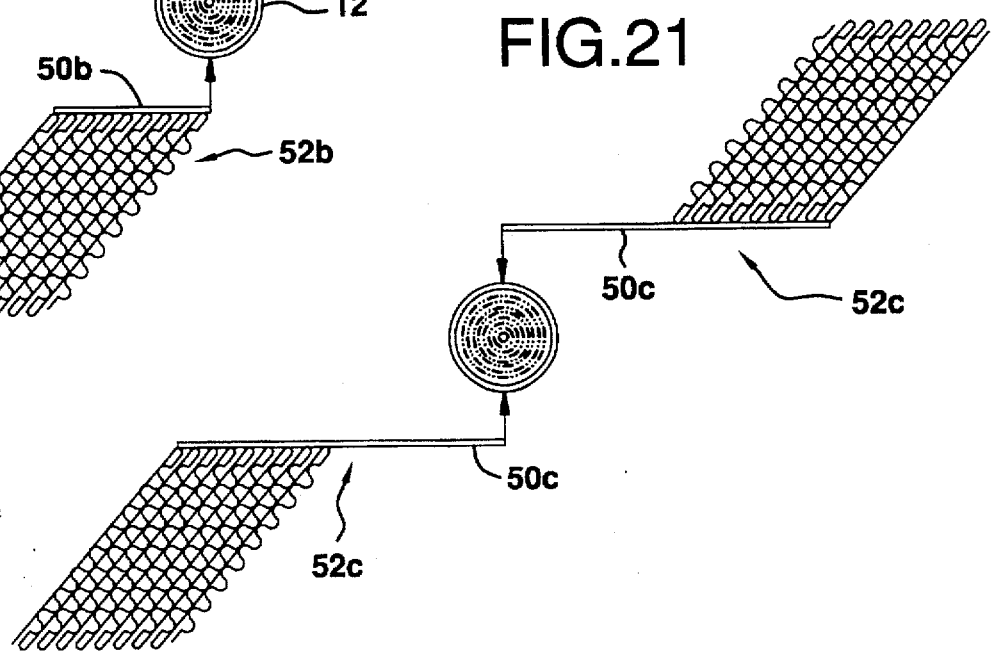

The central core units 12a, 12b, and 12c illustrated in FIGS. 17-19 represent preformed units which may be assembled and stocked for use as needed in the manufacture of converter core bodies of the general construction illustrated in FIG. 1. A method of assembling the preformed units is depicted in FIGS. 20 and 21. In FIG. 20, a pair of relatively inverted tail piece subassemblies 52, 52b(FIGS. 7 and 8) are first joined at the ends of the tail pieces 50, 50b to diametrically opposite sides of the core unit 12a, 12b, 12c. The tail pieces are then wrapped about the core unit to form the central core 12 shown in FIG. 2A. The projecting end margins of the core unit and end margins 51 are spot welded to secure the assembly. Alternatively, where the tailpieces are elongated as shown in FIG. 21, the central core shown in FIG. 2B is formed.

The method of the invention may also be practiced by forming the central core unit and wrapping the tail piece subassemblies in a single sequence of steps.

Figure 14:

As shown in FIG. 22, a variant of the central core foil subassembly 53d illustrated in FIG. 14, in which two cycles of the strip 40 of FIG. 4 are superimposed, is joined at its ends to the ends of two tail pieces 50 of two tail piece subassemblies 52. It will be noted that the subassemblies 52 are joined to opposite sides of the central core foil assembly 54.

The joined assemblies of FIG. 22 are then wound by a slotted mandrel 62 so that the central core 12 is initially formed as a double spiral coil of the alternating corrugated and flat foil segments. Also in FIG. 22, the opposite ends of the central core foil segment which define the outer periphery of the wound coil are flat segments 56 of the central coil foil. Upon winding, the structure reaches the configuration illustrated in FIG. 23.

When the central core coil is wound to the configuration of FIG. 23, a diametric hole may be bored through the coil and a pin 67 inserted in the hole to secure the wound coil. The coil is again wound so that each tail piece 50 of the subassemblies 52 wrap about an additional one-half of the outer periphery of the core unit 12 to form the outer central core layer 29 shown in FIG. 2B. The resulting quite flexible assembly may be inserted into the jacket tube 20 lined with brazing foil or brazing paste and this assembly inductively heated to fuse the brazing foil and secure the strips to the inside of the jacket 20.

To do this, the subassembly preferably is put in a chamber. The air is evacuated and preferably backfilled with argon. A vacuum can be used as well so long as the oxygen is removed. Also in that chamber is an induction coil which goes around the jacket with about an eighth to a quarter inch clearance between the coil and the jacket. When the induction coil is energized, it heats the jacket and the outermost tips of the foil leaves by induction with a very localized heating effect, melting the brazing metal at the outside diameter. The outside portion of the leaves do not have the coating on them so they braze nicely at the outside diameter.

A further measure of compliance in the converter body or catalytic converter 10 of the invention may be effected at the connection of the outer ends 26 of the leaves 22 and 24 to the jacket tube 20. In this respect, the flat leaves 22 tend to buckle under thermal cycling due to a "column effect", particularly near the point of attachment to the jacket tube. The corrugated leaves 24 do not have this problem because they yield at each corrugation as a spring in response to longitudinal compression.

Figure 24:
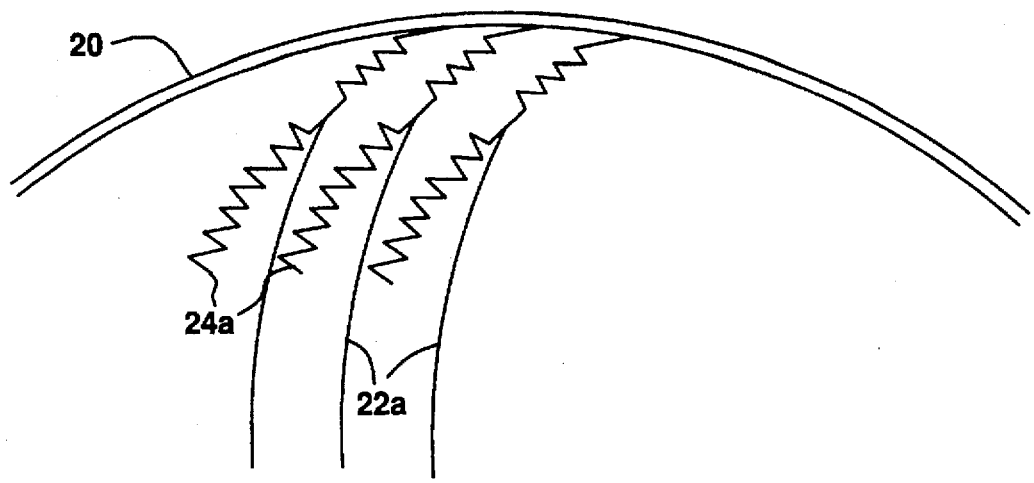
FIGS. 24-26 are fragementary end views illustrating a pliant leaf end connection of the invention.
Figure 25:
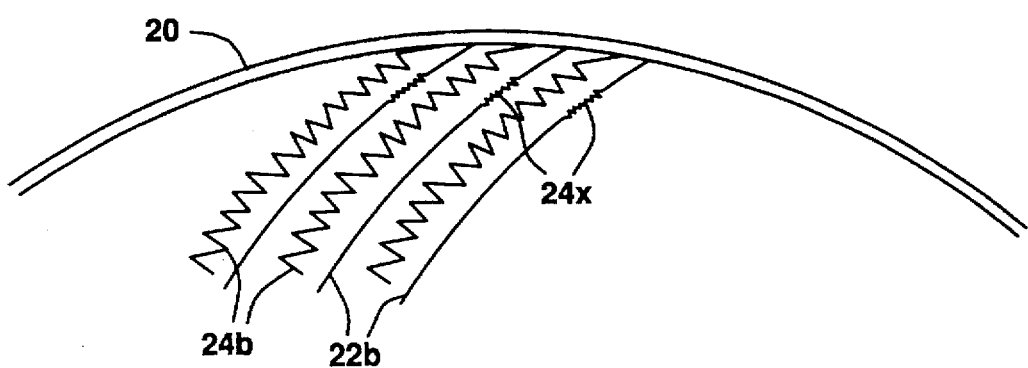
Figure 26:
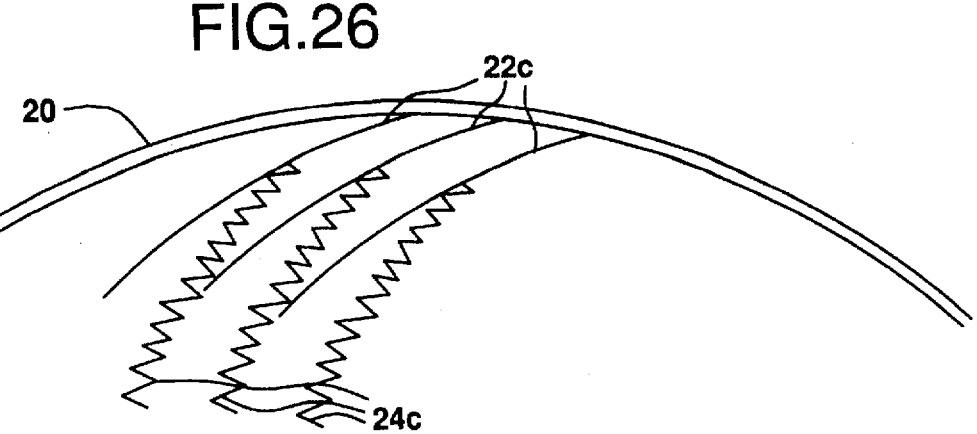

In FIGS. 24-26 of the drawings, variants of leaf end connections to the outer jacket 20 are illustrated. In FIG. 24, the flat leaves 22a are connected at their outer ends to the corrugated leaves 24a of near the outer ends of the corrugated leaves attached to the jacket tube 20. Thus, the end portions of the corrugated leaves 24a are used to avoid buckling of the flat leaves 22a at the outer periphery of the converter body.

In FIG. 25, the corrugated leaves 24b are again joined at their outer ends to the jacket tube 20. In addition, the flat leaves 22b are so joined but each of the flat leaves are provided with fine pitch corrugations 24x. Thus, although both types of leaves are connected directly at their outer ends to the jacket 20, both are able to yield in response to longitudinal stress.

In FIG. 26, flat leaves 22c are connected to the jacket 20 whereas the corrugated leaves 24c terminate in a connection to the flat leaves 22c near the connection thereof to the jacket 20. In this way, any buckling that occurs in the flat leaves 22c will be confined to the ends thereof connected to the jacket 20.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a converter body comprising:

assembling a first plurality of non-nestable foil leaves, each having opposite proximal and distal ends defining a leaf length, by interconnecting the proximal ends of the foil leaves to provide a continuous flexible strip of overlapping foil leaves in which the distal ends of the leaves extend freely;

providing a core foil subassembly of a second plurality of non-nestable foil leaves;

partially connecting the core foil subassembly and the strip of foil leaves;

arranging the strip of foil leaves and the core foil subassembly into a central core having the foil leaves of the strip lying in curved paths radiating outwardly from the interconnected proximal ends away from the central core to provide flow passages generally transverse to the leaf length; and subsequently connecting the distal ends of the foil leaves of the strip to a jacket tube.

2. The method of forming a catalytic converter comprising the steps of:

assembling at least one stack of alternating corrugated and flat catalyst coated foil leaves, each having uncoated opposite ends; joining one end of each of the foil leaves of the at least one stack to a tail piece of uncoated sheet metal to form at least one tail piece subassembly;

forming a central core of a plurality of non-nestable foil strips arranged toe provide a flow passages, wherein the non-nestable foil strips are at least partially coated with a catalyst;

partially joining the tail piece of the at least one tail piece subassembly to the central core; and wrapping said at least one tail piece subassembly about the central core to provide a radiating leaf section having foil leaves projecting in adjacent curved paths outwardly from the central core.

3. The method of claim 2, wherein said at least one tail piece subassembly comprises two tail piece subassemblies, and the two tail piece subassemblies are partially joined to the central core, wherein the tail piece of each of the tail piece subassemblies has a length approximating the circumference of the central core, and the foil leaves joined to each tail piece occupy one half the length of each tail piece.

4. The method of claim 3 wherein the tail pieces are wrapped about the central core in overlapping relation to form a tube about the core with the foil leaves projecting from the circumference of the tube.

5. The method of claim 4, wherein the width of the tail pieces is greater than the width of the non-nestable foil strips of the central core to provide tube marginal edges which project axially beyond the axial length of the central core.

6. The method of making a catalytic converter comprising the steps of:

forming a continuous length of metal foil having longitudinally alternating flat and corrugated catalyst coated segments separated by non-coated segments;

cutting the continuous length of metal foil at the non-coated segments spaced by a plurality of the alternating flat and corrugated catalyst coated segments to form a leaf blank;

folding the leaf blank at the non-coated segments to provide a stack of alternating flat and corrugated foil leaves with opposite ends of each leaf being uncoated;

joining the stack of foil leaves to a tail piece of uncoated sheet mental to form a foil leaf tail piece subassembly;

forming a central core of alternating corrugated and flat foil strips, wherein the foil strips are at least partially coated with a catalyst; and joining the tail piece of the foil leaf tail piece subassembly to the central core; and wrapping the foil leaf tail piece subassembly about the central core.

7. The method of forming a catalytic converter comprising the steps of:

assembling at least one stack of a plurality of catalyst coated corrugated foil leaves defining fluid passage cells, each of the leaves having uncoated opposite ends;

joining one end of each of the foil leaves of the at least one stack to a tail piece of uncoated sheet metal to form at least one tail piece subassembly;

forming a central core of corrugated foil defining fluid passage cells;

joining at least one end of the tail piece to the central core; and wrapping the at least one tail piece subassembly about the central core.

8. The method of claim 7 comprising the step of joining the other of the opposite ends of the foil leaves to a jacket tube.

9. The method of claim 7 wherein said at least one tail piece subassembly comprises two tail piece subassemblies, each having a tail piece to which one end of each of the foil leaves in is joined, and joining at least one end of each tail piece to the central core.

10. The method of claim 9, wherein each of the tail pieces has a length approximating the circumference of the central core, and the foil leaves joined to each tail piece occupy one half the length of each tail piece, and wherein the tail pieces are wrapped on the central core in overlapping relation with the foil leaves projecting from the circumference of the central core.

* * * * *

UNITED STATES PATENT AND TRADEMARK OFFICE
CERTIFICATE OF CORRECTION

PATENT NO. : 5,737,839
DATED : April 14, 1998
INVENTOR(S) : Whittenberger, et al It is certified that error appears in the above-indentified patent and that said Letters Patent is hereby corrected as shown below:

On the title page, Item [75], should read as follows:

Inventors: William A. Whittenberger, Leavittsburg; John J. Chlebus, Brookfield, both of Ohio; Joseph E. Kubsh, Silver Spring, Md; Boris Y. Brodsky, Mayfield Heights, Ohio Signed and Sealed this Fifteenth Day of September, 1998

Attest:

BRUCE LEHMAN

*Attesting Officer*  *Commissioner of Patents and Trademarks*